United States Patent
Sandhu (10) Patent No.: US 10,956,977 B2
(45) Date of Patent: Mar. 23, 2021

(54) METHODS AND SYSTEMS FOR FACILITATING FINANCIAL EXCHANGES BETWEEN LIQUIDITY TAKERS AND LIQUIDITY PROVIDERS

(71) Applicant: Integral Development Inc., Palo Alto, CA (US)

(72) Inventor: Harpal Sandhu, Palo Alto, CA (US)

(73) Assignee: INTEGRAL DEVELOPMENT, INC., Palo Alto, CA (US)

( * ) Notice: Subject to any disclaimer, the term of this patent is extended or adjusted under 35 U.S.C. 154(b) by 120 days.

(21) Appl. No.: 14/216,806

(22) Filed: Mar. 17, 2014

(65) Prior Publication Data
US 2014/0279335 A1   Sep. 18, 2014

Related U.S. Application Data

(60) Provisional application No. 61/799,490, filed on Mar. 15, 2013.

(51) Int. Cl.
*G06Q 40/04* (2012.01)
*G06Q 40/02* (2012.01)

(52) U.S. Cl.
CPC ........... *G06Q 40/04* (2013.01); *G06Q 40/025* (2013.01)

(58) Field of Classification Search
CPC ........ G06Q 40/04; G06Q 40/06; G06Q 30/06; G06Q 30/02; G06Q 30/0601; G06Q 30/08;
(Continued)

(56) References Cited

U.S. PATENT DOCUMENTS 6,236,972 B1 * 5/2001 Shkedy ................ G06Q 10/087
705/26.1
6,334,110 B1 * 12/2001 Walter ................... G06Q 30/02
705/14.41
(Continued)

FOREIGN PATENT DOCUMENTS

WO       WO-0217189 A1 *  2/2002  ............. G06Q 20/10
WO    WO-2005036354 A2 *  4/2005  ............. G06Q 40/04

OTHER PUBLICATIONS

Li et al.: Priority based Matchmaking Method of Buyers and Suppliers in B2B e-marketplace Using Multi-objective Optimization, 2009, Proceedings of the Interrnational MultiConference of Engineers and Computer Scientists, vol. I, IMECS 2009, Hong Kong, pp. 1-6. (Year: 2009).*

(Continued)

*Primary Examiner* — Bjendra K Shrestha
(74) *Attorney, Agent, or Firm* — Artegis Law Group, LLP (57) ABSTRACT

Methods and systems for facilitating transactions between a plurality of liquidity takers (LTs) and a plurality of liquidity providers (LPs) are disclosed. In one example, a computer-implemented method for facilitating transactions between a plurality of LTs and a plurality of LPs is provided. The method may include: (i) assigning a unique identifier to each LP and each LT among a plurality of LPs and LTs in a financial market; (ii) establishing a unique communication channel with each LP and each LT among the plurality of LPs and LTs; (iii) obtaining a plurality of pricing streams from one or more of the plurality of LPs via the unique communication channel established with the one or more of the plurality of LPs; (iv) analyzing LP pricing stream configuration information; and (v) transmitting the plurality of pricing streams to one or more of the plurality of LTs based on the LP pricing stream configuration information.

10 Claims, 9 Drawing Sheets

(58) Field of Classification Search
CPC ........... G06Q 30/0269; G06Q 30/0275; G06Q 30/0641; G06Q 40/00; G06Q 40/08; G06Q 40/025

See application file for complete search history.

(56) References Cited

U.S. PATENT DOCUMENTS

| | | | | |
|---|---|---|---|---|
| 6,957,192 | B1* | 10/2005 | Peth | G06Q 20/10 |
| | | | | 705/35 |
| 7,542,922 | B2* | 6/2009 | Bennett | G06Q 20/20 |
| | | | | 235/376 |
| 7,752,116 | B2* | 7/2010 | Ascher | G06Q 40/04 |
| | | | | 705/35 |
| 8,145,549 | B2* | 3/2012 | Das | G06Q 20/10 |
| | | | | 705/35 |
| 8,180,685 | B2* | 5/2012 | Bloomfield | G06Q 30/0601 |
| | | | | 705/26.3 |
| 8,204,790 | B1* | 6/2012 | Rogers | G06Q 30/0601 |
| | | | | 705/26.1 |
| 8,255,269 | B1* | 8/2012 | Aued | G06Q 30/08 |
| | | | | 705/7.35 |
| 8,290,824 | B1* | 10/2012 | Mesaros | G06Q 30/06 |
| | | | | 705/14.23 |
| 8,311,896 | B2* | 11/2012 | Mesaros | G06Q 30/06 |
| | | | | 235/383 |
| 8,504,483 | B2* | 8/2013 | Foley | G06Q 20/383 |
| | | | | 705/74 |
| 8,577,782 | B2* | 11/2013 | Petruzzi | G06Q 40/04 |
| | | | | 705/37 |
| 9,087,359 | B2* | 7/2015 | Chassin | G06Q 30/08 |
| 2003/0004859 | A1* | 1/2003 | Shaw | G06Q 40/04 |
| | | | | 705/37 |
| 2003/0216971 | A1* | 11/2003 | Sick | H02J 3/008 |
| | | | | 705/7.36 |
| 2004/0019554 | A1* | 1/2004 | Merold | G06Q 40/04 |
| | | | | 705/37 |
| 2004/0039689 | A1 | 2/2004 | Penney et al. | |
| 2004/0088242 | A1 | 5/2004 | Ascher et al. | |
| 2006/0026090 | A1 | 2/2006 | Balabon | |
| 2006/0059010 | A1* | 3/2006 | Chavis-Smith | G06Q 30/0283 |
| | | | | 705/400 |
| 2006/0129480 | A1* | 6/2006 | Tabb | G06Q 20/10 |
| | | | | 705/39 |
| 2007/0011039 | A1* | 1/2007 | Oddo | G06F 21/316 |
| | | | | 705/7.33 |
| 2007/0130051 | A1* | 6/2007 | Sutton | G06Q 20/12 |
| | | | | 705/37 |
| 2007/0130070 | A1* | 6/2007 | Williams | H04L 63/04 |
| | | | | 705/50 |
| 2009/0012874 | A1* | 1/2009 | Case | G06Q 30/0617 |
| | | | | 705/26.42 |
| 2010/0094727 | A1* | 4/2010 | Shapiro | G06Q 30/06 |
| | | | | 705/26.1 |
| 2010/0293085 | A1* | 11/2010 | Mackay | G06Q 30/08 |
| | | | | 705/37 |
| 2011/0276455 | A1* | 11/2011 | Schoen | G06Q 40/04 |
| | | | | 705/37 |
| 2013/0080336 | A1* | 3/2013 | Van Wie | G06Q 30/06 |
| | | | | 705/80 |

OTHER PUBLICATIONS

Hall, Emma: Online Ad Effectiveness Depends on Time of Day, Study: Consumers More Likely to Pay Attention to Marketers at Night, Apr. 27, 2009, AdAge.com, pp. 1-3 . (Year: 2009).*

Li et al.: Priority-based Matchmaking Method of Buyers and Suppliers in B2B e-marketplace Using Multi-objective Optimization, Mar. 2009, IMECS 2009, pp. 1-6 (Year: 2009).*

Kollman, Tobias: Measuring the acceptance of electronic marketplace: A study based on a used-car trading site, Jun. 23, 2006, Journal of Computer-Mediated Communication, vol. 6, Issue 2, pp. 1-21 (Year: 2006).*

International Search Report and Written Opinion, dated Aug. 27, 2014, International Application No. PCT/US2014/030667, 14 pages.

* cited by examiner

METHODS AND SYSTEMS FOR FACILITATING FINANCIAL EXCHANGES BETWEEN LIQUIDITY TAKERS AND LIQUIDITY PROVIDERS

CROSS REFERENCE TO RELATED APPLICATIONS AND CLAIM FOR PRIORITY

The instant application is related to and claims priority to previously filed U.S. provisional patent application No. 61/747,698 filed Dec. 31, 2012 sharing the same title, and U.S. provisional patent application No. 61/799,490 filed Mar. 15, 2013 also sharing the same title.

FIELD

Aspects of the present disclosure relate to methods and systems for facilitating financial exchanges, or transactions, between a plurality of liquidity takers (each a "LT," collectively "LTs") and a plurality of liquidity providers (each a "LP," collectively "LPs").

BACKGROUND

LTs and LPs frequently have different concerns with regard to the issues affecting the financial market, or markets, in which they transact business. For example, LPs are often interested in providing customized pricing on particular financial products to different LTs. Stated differently, LPs would like to offer a given LT a particular price on a financial product at a particular point in time and offer a different LT a different price on the same financial product at the same point in time. The ability of LPs to provide customized pricing to different LTs frequently serves to advance the LPs' economic objectives.

Conversely, LTs are frequently concerned with obtaining the optimal (i.e., "best") pricing on a given financial product in order to meet their own economic objectives. Typically, this involves LTs seeking out pricing information for a given financial product from a plurality of prospective counterparties (e.g., a plurality of LPs). In this manner, a given LT may identify the optimal pricing relative to the desired financial product by "shopping around." However, conventionally, the process of shopping around for pricing on financial products was arduous, frequently requiring the establishment of separate, direct lines of communication with all prospective counterparties.

For example, in the past, a party wishing to transact a particular foreign exchange (forex) product would often have to contact (e.g., via telephone or the like) several different prospective counterparties in order to evaluate available pricing. This process, requiring the establishment of separate communication channels with each prospective counterparty, demanded a tremendous expenditure of resources. For example, in a scenario where only a single communication channel is available, there is a tremendous waste of time associated with establishing separate, successive communication channels with prospective counterparties. As a corollary, there is a tremendous financial burden imposed upon parties wishing to establish multiple communication channels capable of communicating with prospective counterparties simultaneously. Although the preceding example focused on the trading of forex financial products, those having ordinary skill in the art will appreciate that the instant discussion of the prior art as well as the subsequent teachings of the instant disclosure may apply equally well to the trading of any financial product, including but not limited to, bonds, interest rates, mortgages, financial derivatives, credit products, loans, deposits, money markets, financial futures, contract for difference (CFDs), energy products, precious metals, commodities, other financial assets, and/or other over-the-counter (OTC) products.

Further still, conventional systems and techniques for facilitating the exchange of financial products often required open disclosure of the identities of the participants in the financial market. Returning to the foreign exchange example, in the past, a party wishing to trade a forex product would have to call each prospective counterparty (the one or more counterparties' identities being known to the party wishing to execute the trade) and reveal their identify. By requiring full disclosure of participants' identities, conventional systems and techniques for facilitating the exchange of financial products permitted bias (e.g., bias based upon past dealings with particular market participants) to seep into the market, preventing all participants from receiving accurate, fair pricing information.

There are two primary value propositions that affect the suitability of a particular trading platform for market participants: (1) liquidity optimization and (2) operational efficiency. As known in the art, liquidity optimization may refer to a market participant's ability to access differentiated pricing from multiple market participants for the same financial product. In addition, and as known in the art, operational efficiency may refer to a market participant's ability to connect with a plurality of counterparts through a single logical connection, or the ability to connect one or more LTs with a plurality of LPs through a single logical connection. Conventional trading platforms are largely designed to provide either good liquidity optimization or good operational efficiency, but not both.

Figure 1:
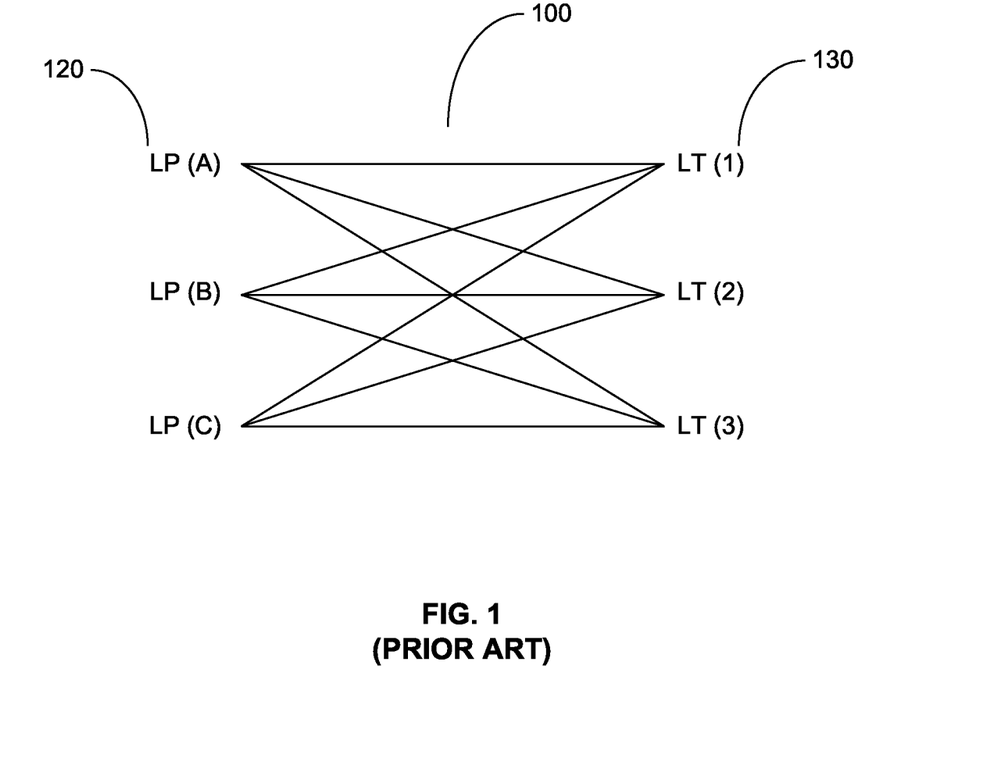
FIG. 1 is a diagram generally depicting one example of a conventional, bilateral market platform for facilitating multiple, bilateral financial transactions.

For example, referring now to FIG. 1, a conventional bilateral market platform 100 for facilitating multiple, bilateral financial transactions is illustrated. In FIG. 1, pricing streams may be exchanged between a plurality of LPs 120 and a plurality of LTs 130 through the platform 100. As noted above, the pricing streams may be relative to any suitable financial product or products for which a market exists, and in one example may include forex financial products.

The conventional bilateral market platform 100 of FIG. 1 is an example of a trading platform that provides good liquidity optimization, but poor operational efficiency. For example, from a liquidity optimization standpoint, bilateral market platform 100 permits LPs to provide customized pricing to each of the LTs. However, from an operational efficiency standpoint, platform 100 requires each LP to establish separate communication channels with each LT. Similarly, platform 100 requires each LT to establish separate communication channels with each LP. This leads to the inefficiencies noted above.

Further, platform 100 is "transparent" in that the identities of each of the market participants (i.e., LPs 120 and LTs 130) are known to all of the market participants. In many respects, transparency can be beneficial for all of the participants in the market. However, in certain circumstances, pricing made available through platform 100 may be susceptible to bias introduced by virtue of the platform's inherent transparency. That is, market participants 120, 130 interacting through platform 100 may not receive the benefit of "fair" pricing, but rather, may be forced to endure biased pricing based upon the known identities of the market participants.

Another drawback associated with the conventional bilateral market platform 100 is that such a platform is "opt-in." That is, this type of platform requires both LPs and LTs to provide necessary permissions in order to receive pricing information. Accordingly, the necessity to receive permissions from all of the LPs and LTs may grow exponentially as new LPs and/or LTs wish to access the financial market facilitated through the platform 100.

Figure 2:
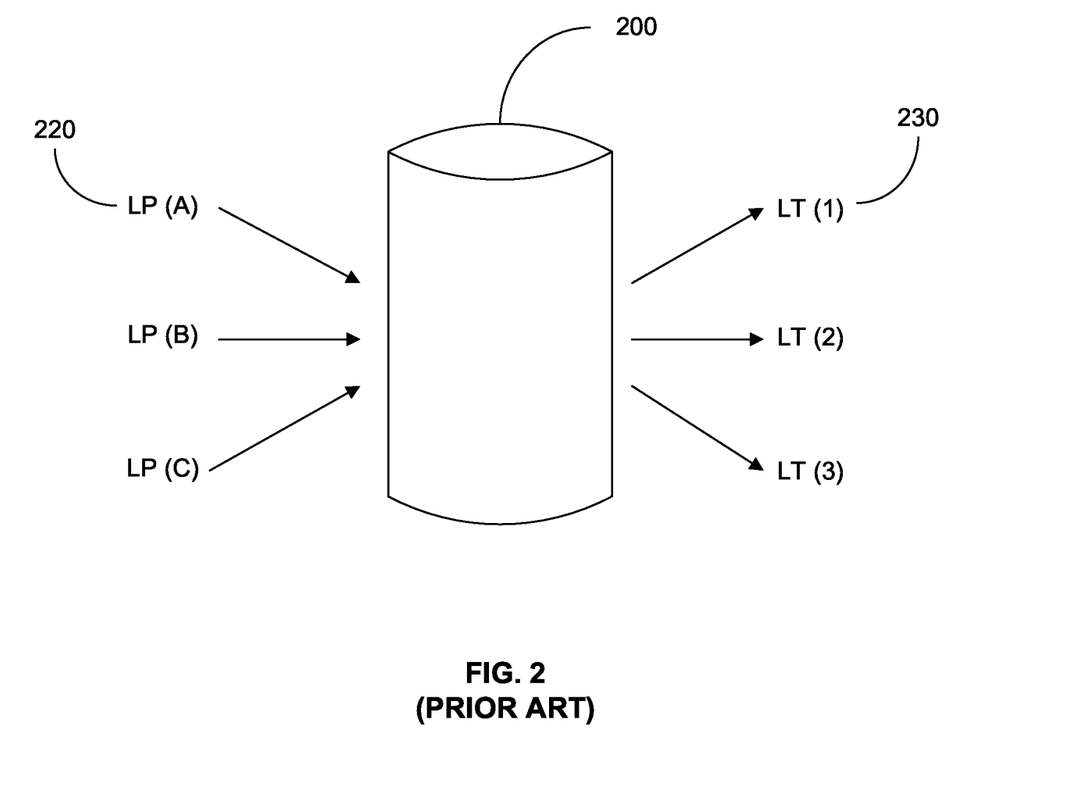
FIG. 2 is a diagram generally depicting one example of a conventional, central order book platform for facilitating financial transactions, which attempts to solve some of the drawbacks associated with the conventional, bilateral market platform.

Referring now to FIG. 2, a diagram illustrating a conventional central order book platform 200 is shown. The central order book platform 200 is an example of a trading platform that provides poor liquidity optimization, but good operational efficiency. From a liquidity optimization standpoint, central order book platform 200 performs poorly in that it requires LPs to provide a single price for a given financial product to all of the LTs (i.e., no customized pricing). However, from an operational efficiency standpoint, central order book platform 200 performs well in that it permits a given LP to transact business with a plurality of LTs through a single logical connection (and, consequently, permits a single LT to transact business with a plurality of LPs).

Further, in FIG. 2, the number of bilateral permissions is limited to only one permission for each of the LPs 220 or the LTs 230 via the central order book platform 200. A disadvantage of this type of platform 200 is that LPs 220 can only provide a single pricing to all of the LTs 230, which precludes customized pricing for each individual LT (e.g., LT(1)). In addition, LTs 230 may often prefer to having plural pricing because they may be the benefactor of customized pricing.

Accordingly, new methods and systems for facilitating financial transactions between a plurality of LTs and a plurality of LPs are desired, aimed at alleviating one or more of the above-noted drawbacks.

SUMMARY

The present disclosure provides methods and systems for facilitating transactions between a plurality of liquidity takers (LTs) and a plurality of liquidity providers (LPs). In one example, a method for facilitating transactions between a plurality of LTs and a plurality of LPs is provided. In this example, the method may include assigning a unique identifier to each LP and each LT among a plurality of LPs and LTs in a financial market. Each unique identifier may be a non-personally identifiable identifier. The method may also include establishing a unique communication channel with each LP and each LT among the plurality of LPs and LTs. The method may also include obtaining a plurality of pricing streams from one or more of the plurality of LPs via the unique communication channel established with the one or more of the plurality of LPs. Further, the method may include analyzing LP pricing stream configuration information. The LP pricing stream configuration information may include information influencing which specific one or more LTs of the plurality of LTs are to receive the plurality of pricing streams. For example, based on the LP pricing stream configuration information, some, all, or none of the LTs in the financial market may receive pricing streams from one or more of the plurality of LPs. Finally, in this example, the method may include transmitting the plurality of pricing streams to one or more of the plurality of LTs based on the LP pricing stream configuration information. In one example, the method may additionally include the step of facilitating the execution of one or more transactions for one or more financial products between one or more of the plurality of LTs and one or more of the plurality of LPs. In still another example, the method may include obtaining the LP pricing stream configuration information from the one or more of the plurality of LPs.

In one example, the LP pricing stream configuration information may be based on various criteria including, but not limited to: the unique identifier assigned to each LT; an economic value of an order flow from one or more of the plurality of LTs to one or more of the plurality of LPs; a volume of orders; an information value of the orders; a market share value; a uniqueness of a financial product sought to be transacted; a time of day; market conditions; testing/experimentation; information gathering; competitive analysis; credit of one or more intermediaries through which one or more of the plurality of LPs are connected to one or more of the plurality of LTs; and/or information disclosure.

In another example, the financial market for which the teachings of the instant disclosure may be applied may include, but is not limited to: a foreign exchange market; a bond market; an interest rate market; an over-the-counter (OTC) market; a mortgage market; a financial derivatives market; a credit products market; a loans market; a deposits market; a money market; a financial futures market; a contract for differences (CFDs) market; an energy products market; a precious metals market; a commodities market; and/or a financial assets market.

In one example, another method for facilitating transactions between a plurality of LTs and a plurality of LPs is provided. In this example, the method may include assigning a unique identifier to each LP and each LT among a plurality of LPs and LTs in a financial market. Each unique identifier may be a non-personally identifiable identifier. The method may also include establishing a unique communication channel with each LP and each LT among the plurality of LPs and LTs. The method may also include obtaining a plurality of pricing streams from one or more of the plurality of LPs via the unique communication channel established with the one or more of the plurality of LPs. Further, the method may include analyzing LT pricing stream configuration information. The LT pricing stream configuration information may include information influencing which specific one or more LPs of the plurality of LPs to receive the plurality of pricing streams from. For example, based on the LT pricing stream configuration information, a given LT may receive pricing streams relative to a given financial product from some, all, or none of the LPs in the financial market. Finally, in this example, the method may include transmitting the plurality of pricing streams to one or more of the plurality of LTs based on the LT pricing stream configuration information.

Furthermore, aspects of the current disclosure provide a matrix that may include an intermediary (e.g., a prime broker, a central credit counterparty, a clearinghouse, or any other suitable intermediaries known to those having ordinary skill in the art) to connect a plurality of LPs with a plurality of LTs. According to various aspects, one or more pricing streams coming from the LPs may be received by the matrix, and the matrix may allocate the one or more pricing streams to specific LTs. According to various aspects, the matrix may allocate the one or more price streams on the basis of various parameters, such as those described above. As a result, each LT only needs a single logical connection to the matrix, from which a set of prices from a plurality of LPs is received. Each LT can also receive a plurality of tailored price streams, but without the disadvantage of having a large number of connections and the associated operational requirements. In addition, a LP also only needs a single connection to the matrix to reach a plurality of LTs to provide each of the plurality of LTs with a customized set of price streams, and LT only needs a single connection to the matrix to receive the pricing streams.

Additional advantages and novel features of these aspects of the disclosure will be set forth in part in the description that follows, and in part will become more apparent to those skilled in the art upon examination of the following or upon learning by practice of the methods and systems described herein.

DETAILED DESCRIPTION

These and other features and advantages of this disclosure are described in, or are apparent from, the following detailed description of various example aspects. It may be evident, however, that such aspects may be practiced without these specific details.

The processing of trades amongst participants to a market (e.g., LTs and LPs), through a system (e.g., an exchange) may be accomplished through using one or more servers and over a network. As used in the following description, an application may include, but is not limited to, a program, and/or segments, modules, snippets and the like, of a program. In particular, the present disclosure enables a system and associated applications to facilitate the trading of financial products (e.g., forex products) in a financial market (e.g., a forex market). Participants in a market may engage in transactions for various reasons, such as, but not limited to, security settlements, passive and/or active hedging, currency alpha, dividends, payments, and the like. The participants have one or more objectives while engaging in financial transactions, such as, but not limited to, minimizing transaction costs, obtaining a fair deal (e.g., no disadvantage in comparison to like positioned participants), efficient and accurate processing, and the like.

Figure 3:
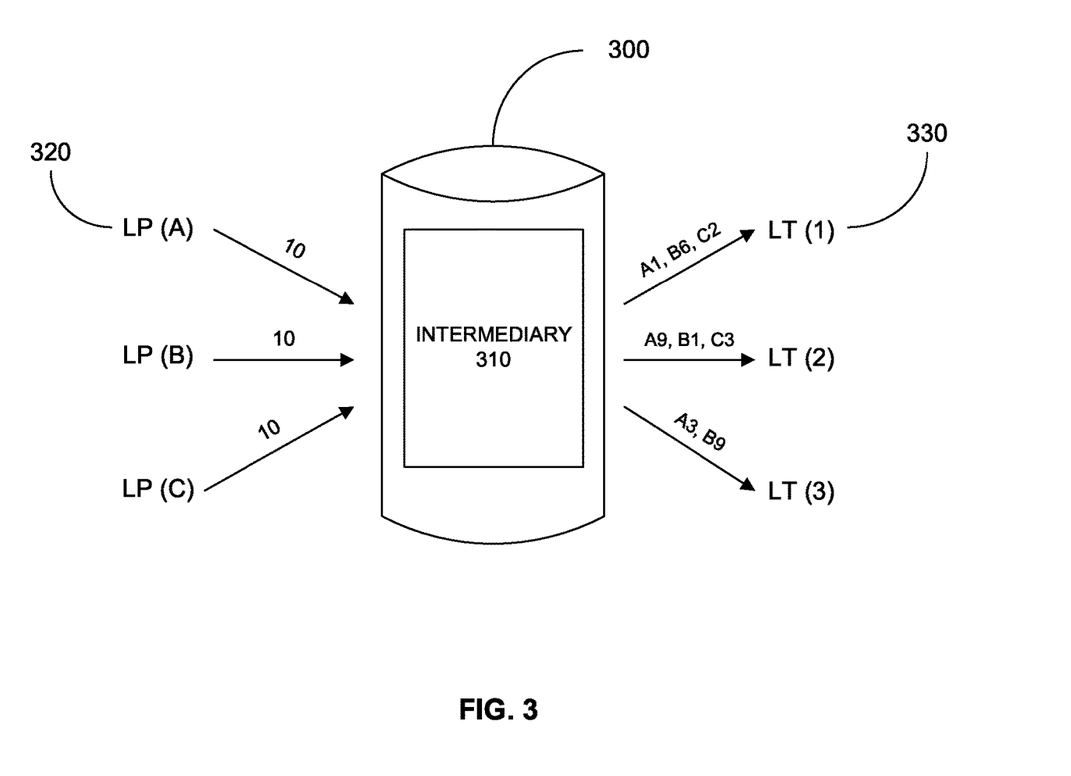
FIG. 3 is diagram illustrating a matrix including an intermediary for liquidity exchange, according to various aspects of the current disclosure.

FIG. 3 is a diagram illustrating a matrix 300 including an intermediary 310 for liquidity exchange, according to various aspects of the instant disclosure. As used herein, a matrix 300 may include, but is not limited to, a trading platform accessible by market participants over one or more communication networks. For example, in one embodiment, the matrix 300 may be visually represented as a graphical user interface (GUI) viewable on display devices connected to participants' computing devices (e.g., desktop PCs, laptop computers, tablets, cellular phones, smart phones, personal digital assistants, etc.). In one example, the matrix GUI may be presented on a webpage accessible to participants over a network, such as the Internet.

As shown in FIG. 3, the matrix 300 may include an intermediary 310, or credit facilitator, communicating with both a plurality of LPs 320 and a plurality of LTs 330. As used herein, an intermediary (e.g., intermediary 310) may include, but is not limited to, a prime broker, a central credit counterparty, a clearinghouse, or any other suitable intermediary known to those having ordinary skill in the art. According to various aspects, each LP (e.g., LP(A)) may provide a plurality of pricing streams to the LTs 330 via the matrix 300. In the aspect illustrated in FIG. 3, each LP (e.g., LP(A)) has ten (10) pricing streams. However, those having ordinary skill in the art will recognize that any suitable number of pricing streams may be provided as desired. According to various aspects, the various pricing streams of the LPs 320 are provided to and received by the intermediary 310 in the matrix 300, and one or more of the pricing streams provided by the LPs 320 are then redistributed to either all of the LTs 330 or to one or more specific LTs 330, where the one or more specific LTs 330 are designated/allocated based on various criteria assessed by the matrix 300.

Criteria assessed by the matrix 300 in designating/allocating the pricing streams may include any criteria affecting the economic value of a given transaction to a given market participant. The criteria may include, but is not limited to, a unique identifier assigned to each LT or LP; an economic value of an order flow from one or more of the plurality of LTs to one or more of the plurality of LPs; a volume of orders; an information value of the orders; a market share value; a uniqueness of a financial product sought to be transacted; a time of day; market conditions; testing/experimentation; information gathering; competitive analysis; credit of one or more intermediaries through which one or more of the plurality of LPs are connected to one or more of the plurality of LTs; information disclosure; an execution quality associated with one or more of the plurality of LPs; one or more prices supplied by one or more of the plurality of LPs concerning a financial product sought to be transacted; a typical response time associated with one or more of the plurality of LPs; a propensity for information leakage associated with one or more of the plurality of LPs; a size available for a the financial product sought to be transacted; and/or price stability associated with the financial product sought to be transacted.

In addition, other criteria may equally be considered in determining which pricing streams are redistributed to the LTs 330. For example, in one embodiment, if a LT is a savvy trader and is "winning" too often on transactions, then the matrix 300 may be configured to redistribute/allocate pricing streams with larger spreads to that LT.

Further, although the above example contemplates redistributing/allocating pricing streams to at least one LT (e.g., LT(1)), those having ordinary skill will recognize that in one embodiment no pricing streams are redistributed/allocated to any of the LTs.

According to various aspects, in an example system having three different LPs, LP(A), LP(B) and LP(C) communicating with three different LTs, LT(1), LT(2) and LT(3), FIG. 3 illustrates an example where LT(1) receives the first price stream from LP(A) (A1), the sixth price stream from LP(B) (B6) and the second price stream from LP(C) (C2). On the other hand, a different LT, LT(2), receives the ninth price stream from LP(A) (A9), the first price stream from LP(B) (B1) and the third price stream from LP(C) (C3). Yet another LT, LT(3), receives the third price stream from LP(A) (A3) and the ninth price stream from LP(B) (B9), but not any price streams from LP(C).

According to various aspects of the current disclosure, the criteria used at the matrix 300, for example at the intermediary 310, to provide customized pricing to LTs, may include a specific price range for LT(1), but a different price range for LT(2). According to various aspects, any given LT only needs a single logical connection to the matrix 300 and the intermediary 310, instead of a plurality of connections to a plurality of LPs 320 with varying price streams, but is able to receive a plurality of pricing streams to choose from. Similarly, each of the LPs 320 only need a single logical connection to the matrix 300 and the intermediary 310 to be able to provide customized pricing streams to a plurality of LTs 330. In one embodiment, each LP and LT may be asked for permission to connect to the matrix 300 a single time, as opposed to a plurality of times as is the case with the conventional bilateral market platforms, such as the platform 100 illustrated in FIG. 1.

Furthermore, while the above description focused on sending particular price streams from LPs to LTs, in one embodiment, the LTs 330 may provide information to the matrix 300 indicating which particular LPs 320 those LTs 330 wish to receive price streams from. For example, a given LT (e.g., LT(1)) may not wish to receive price streams from a particular LP (e.g., LP(A)) because of, for example, concerns over information leakage. In this embodiment, any individual LT may explicitly designate (e.g., by communicating information reflecting as much) one or more LPs from which that LT does not wish to receive price streams. In still another embodiment, rather than making an explicit designation, any individual LT may configure certain criteria (referred to elsewhere herein as LT pricing stream configuration information) to be assessed by the matrix 300 in determining whether or not a given LT should receive price streams from a given LP. This criteria may include, but is not limited to: an execution quality associated with one or more of the plurality of LPs; one or more prices supplied by one or more of the plurality of LPs concerning a financial product sought to be transacted; a typical response time associated with one or more of the plurality of LPs; a propensity for information leakage associated with one or more of the plurality of LPs; a size available for a the financial product sought to be transacted; and/or price stability associated with the financial product sought to be transacted Referring now to FIG. 4, a block diagram illustrating one example of a computing system 400 for facilitating transactions between a plurality of liquidity takers (LTs) 402 and a plurality of liquidity providers (LPs) 404 is provided. As shown, the computing system 400 may include a communications module 412, a unique identifier assigning module 406 operatively connected to the communications module 412, a pricing stream allocation module 408 operatively connected to the communications module 412, and a transaction execution module 422 operatively connected to the communications module. Market participants (e.g., LTs 402 and/or LPs 404) may communicate with the computing system 400 over one or more wired or wireless networks as shown, using network communication techniques well known in the art.

In operation, computing system 400 may function as follows. The unique identifier assigning module 406 is configured to assign a unique identifier to each LP and LT (the unique identifiers represented as reference numerals 420a-420d of FIG. 4) participating in the market. The unique identifiers 420a-d are non-personally identifiable identifiers, in that they do not convey any specific information about the identities of the underlying LPs 402 and LTs 404. In this manner, the unique identifiers 420a-d ensure "pseudonimity" amongst the market participants 402, 404. Among other advantages, pseudonimity may prevent LPs 404 from taking advantage of the LTs 402, and may also protect the LPs 402 from LTs 404 that may present a financial risk. In one example, the unique identifiers 420a-d may include a string of text, numbers, or symbols representing each of the market participants 402, 404.

Figure 4:
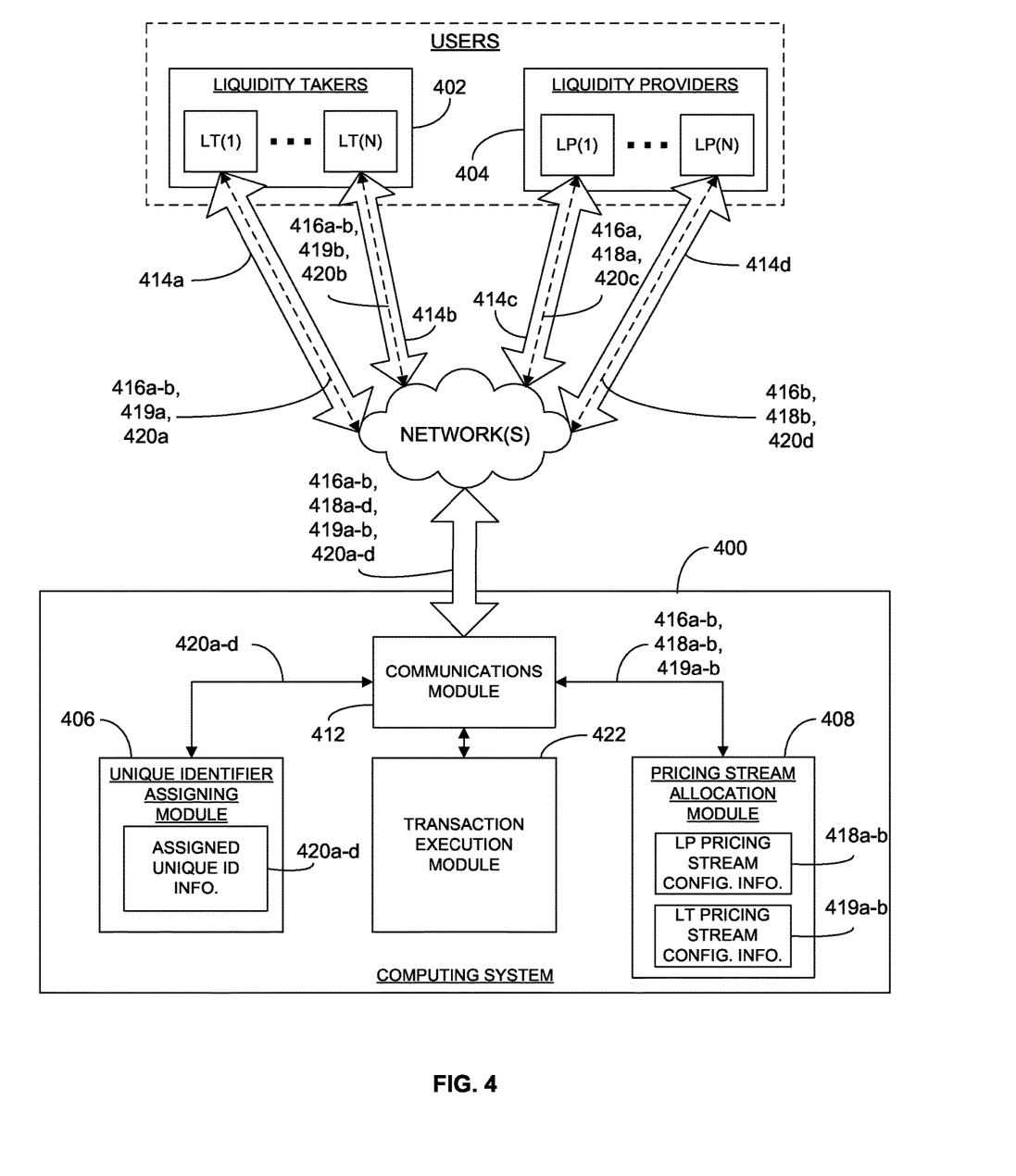
FIG. 4 is a block diagram illustrating one example of a computing system for facilitating transactions between a plurality of liquidity takers (LTs) and a plurality of liquidity providers (LPs), according to various aspects of the current disclosure.

The communications module 412 is configured to establish a unique communication channel with each LP and each LT. The communications module 412 of FIG. 4 is illustrated as having established a first unique communication channel 414a with LT(1), a second unique communication channel 414b with LT(N), a third unique communication channel 414c with LP(1), and a fourth unique communication channel 414d with LP(N). Techniques for establishing communications channels over a network are well known to those having ordinary skill in the art.

Once the communication channels 414a-d have been established, a variety of information may be conveyed between the computing system 400 and the market participants 402, 404 via the channels 414a-d. For example, the unique identifiers 420a-d may be conveyed to all or some of the market participants 402, 404. In this manner, each market participant may know the unique identifier assign to themselves, as well as the unique identifiers assigned to some or all of the other market participants. In addition, the communications module 412 is configured to obtain pricing streams (e.g., pricing streams 416a-b) from one or more of the LPs 404 via the unique communication channels (e.g., channels 414c-d). Thus, pricing stream 416a reflects a stream of prices offered by LP(1) relative to one or more financial products over time. Similarly, pricing stream 416b reflects a stream of prices offered by LP(N) relative to one or more financial products over time.

The pricing stream allocation module 408 is configured to allocate the price streams 416a-b received from the LPs 404 to none, some, or all of the LTs 402 based, for example, on LP pricing stream configuration information 418a-b and/or LT pricing stream configuration information 419a-b. Thus, LP pricing stream configuration information 418a reflects pricing stream configuration information associated with (e.g., obtained from) LP(1), while LP pricing stream configuration information 418b reflects pricing stream configuration information associated with (e.g., obtained from) LP(N). Similarly, LT pricing stream configuration information 419a reflects pricing stream configuration information associated with (e.g., obtained from) LT(1), while LT pricing stream configuration information 419b reflects pricing stream configuration information associated with (e.g., obtained from) LT(N). As noted above, several factors may influence the specific LT pricing stream configuration information 419a-b and/or the specific LP pricing stream configuration information 418a-b, including those set forth in additional detail above.

From the perspective of the LPs 404, the LP pricing stream configuration information 418a-b includes information affecting which (if any) of the LTs are to receive the pricing streams 416a-b. In one example, the LP pricing stream configuration information 418a-b may be received by the pricing stream allocation module 408 from one or more of the LPs 404, and may specifically designate which particular LTs are to receive the pricing streams 416a-b (e.g., by identifying the particular LTs desired to receive the pricing streams using those LTs' assigned unique identifiers).

In another example, the LP pricing stream configuration information 418a-b furnished by one or more of the LPs 404 may not specifically designate which particular LTs are to receive the price streams, but rather, may include criteria to be assessed by the pricing stream allocation module 408. In this example, the pricing stream allocation module 408 is configured to decide which LTs are to receive pricing streams based on the criteria. For example, the criteria information may indicate that a particular LP only wants to provide pricing streams to certain LTs whose profiles' satisfy the criteria information. The pricing stream allocation module 408 is configured to compare profile information about the LTs 402 with the criteria information and only allocate pricing streams to those LTs meeting the criteria information.

From the perspective of the LTs 402, the LT pricing stream configuration information 419a-b includes information affecting which (if any) LPs 404 the LTs 402 are to receive pricing streams from. In one example, the LT pricing stream configuration information 419a-b may be received by the pricing stream allocation module 408 from one or more of the LTs 402, and may specifically designate which particular LPs the one or more LTs would like to receive pricing streams (e.g., pricing streams 416a-b) from (e.g., by identifying the particular LPs from whom pricing streams are desired using those LPs' assigned unique identifiers).

In another example, the LT pricing stream configuration information 419a-b furnished by one or more of the LTs 402 may not specifically designate which particular LPs pricing streams are sought from, but rather, may include criteria to be assessed by the pricing stream allocation module 408. In this example, the pricing stream allocation module 408 is configured to decide which LPs to furnish pricing streams (e.g., pricing streams 416a-b) from based on the criteria. For example, the criteria information may indicate that a particular LT only wants to receive pricing streams from certain LPs whose profiles' satisfy the criteria information. The pricing stream allocation module 408 is configured to compare profile information about the LPs 404 with the criteria information and only allocate pricing streams of those LPs meeting the criteria information.

After the pricing stream allocation module 408 has determined which LTs are to receive the price streams 416a-b from the one or more LPs 404 (based upon, for example, the LP pricing stream configuration information 418a-b and/or the LT pricing stream configuration information 419a-b), the communications module 412 is configured to transmit the pricing streams 416a-b to one or more of the LTs 402.

After the one or more LTs 402 have had an opportunity to review the one or more pricing streams supplied by the one or more LPs 404 (e.g., pricing streams 416a, 416b, or 416a and 416b), a given LT may wish to execute a transaction with a given LP. Accordingly, computing system 400 includes the transaction execution module 422. The transaction execution module 422 is configured to facilitate the execution of one or more transactions for one or more financial products between one or more of the LTs 402 and one or more of the LPs 404. Techniques and hardware configurations for facilitating the execution of financial transactions are known to those having ordinary skill in the art.

Figure 5:
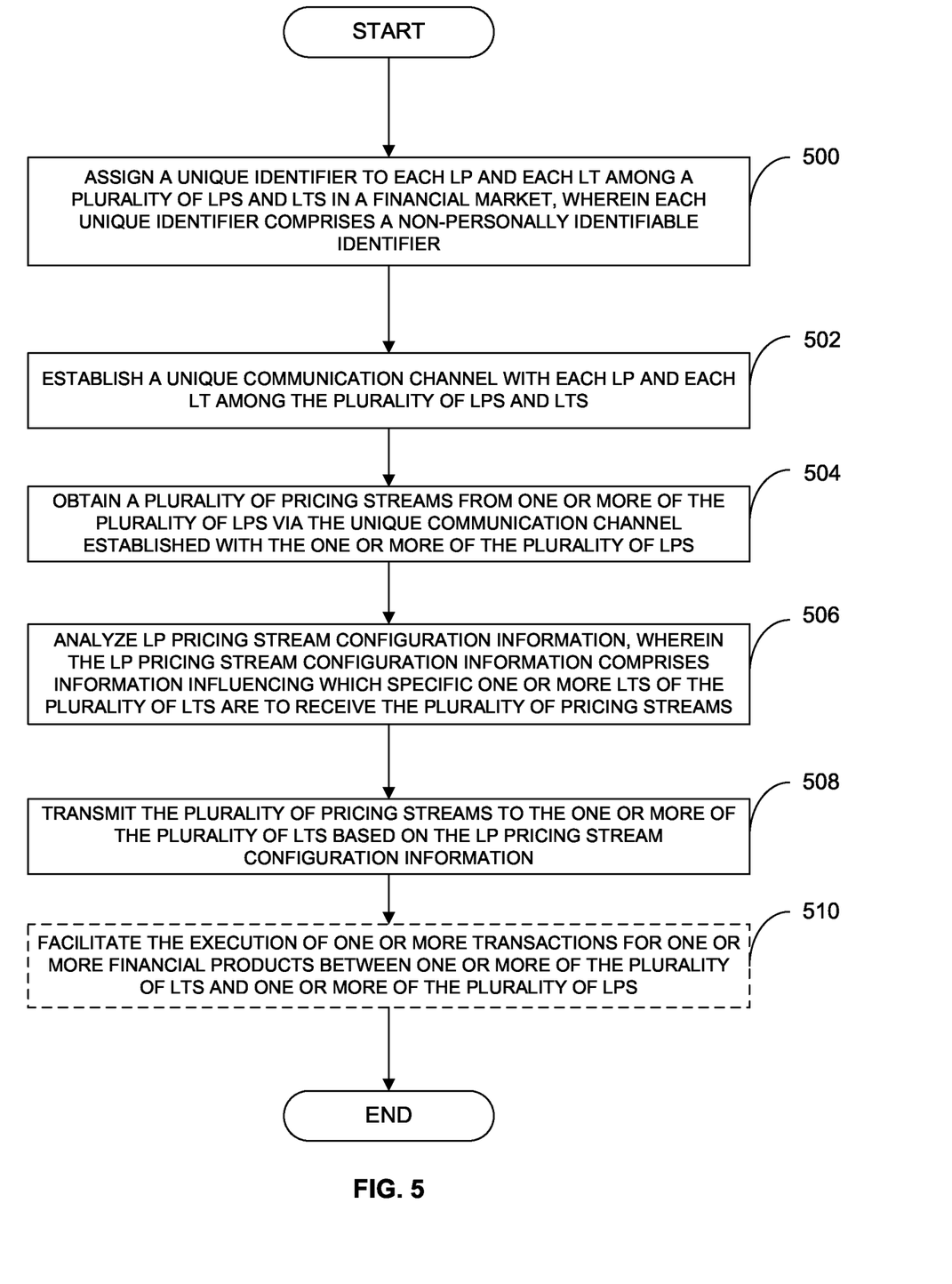
FIG. 5 is a flowchart illustrating one example of a method for facilitating transactions between a plurality of liquidity takers (LTs) and a plurality of liquidity providers (LPs), according to various aspects of the current disclosure.

Referring now to FIG. 5, a flowchart illustrating one example of a method for facilitating transactions between a plurality of LTs and LPs is provided. While the computing system 400 is one form for implementing the processing described herein (including that illustrated in FIG. 5), those having ordinary skill in the art will appreciate that other, functionally equivalent techniques may be employed. Furthermore, as known in the art, some or all of the functionalities implemented via executable instructions may also be implemented using firmware and/or hardware devices such as application specific integrated circuits (ASICs), programmable logic arrays, state machines, etc. One again, those of ordinary skill in the art will appreciate the wide number of variations that may be used in this manner.

Beginning at step 500, a unique identifier is assigned to each LP and each LT among a plurality of LPs and LTs in a financial market, wherein each unique identifier comprises a non-personally identifiable identifier. At step 502, a unique communication channel is established with each LP and each LT among the plurality of LPs and LTs. At step 504, a plurality of pricing streams are obtained from one or more of the plurality of LPs via the unique communication channel established with one or more of the plurality of LPs. At step 506, LP pricing stream configuration information is analyzed (e.g., by the pricing stream allocation module 408 of FIG. 4). The LP pricing stream configuration information may include information influencing which specific LTs are to receive the plurality of pricing streams. At step 508, the plurality of pricing streams may be transmitted to one or more of the plurality of LTs based on the LP pricing stream configuration information. At optional step 510, the execution of one or more transactions for one or more financial products between one or more of the plurality of LTs and one or more of the plurality of LPs may be facilitated.

Figure 6:
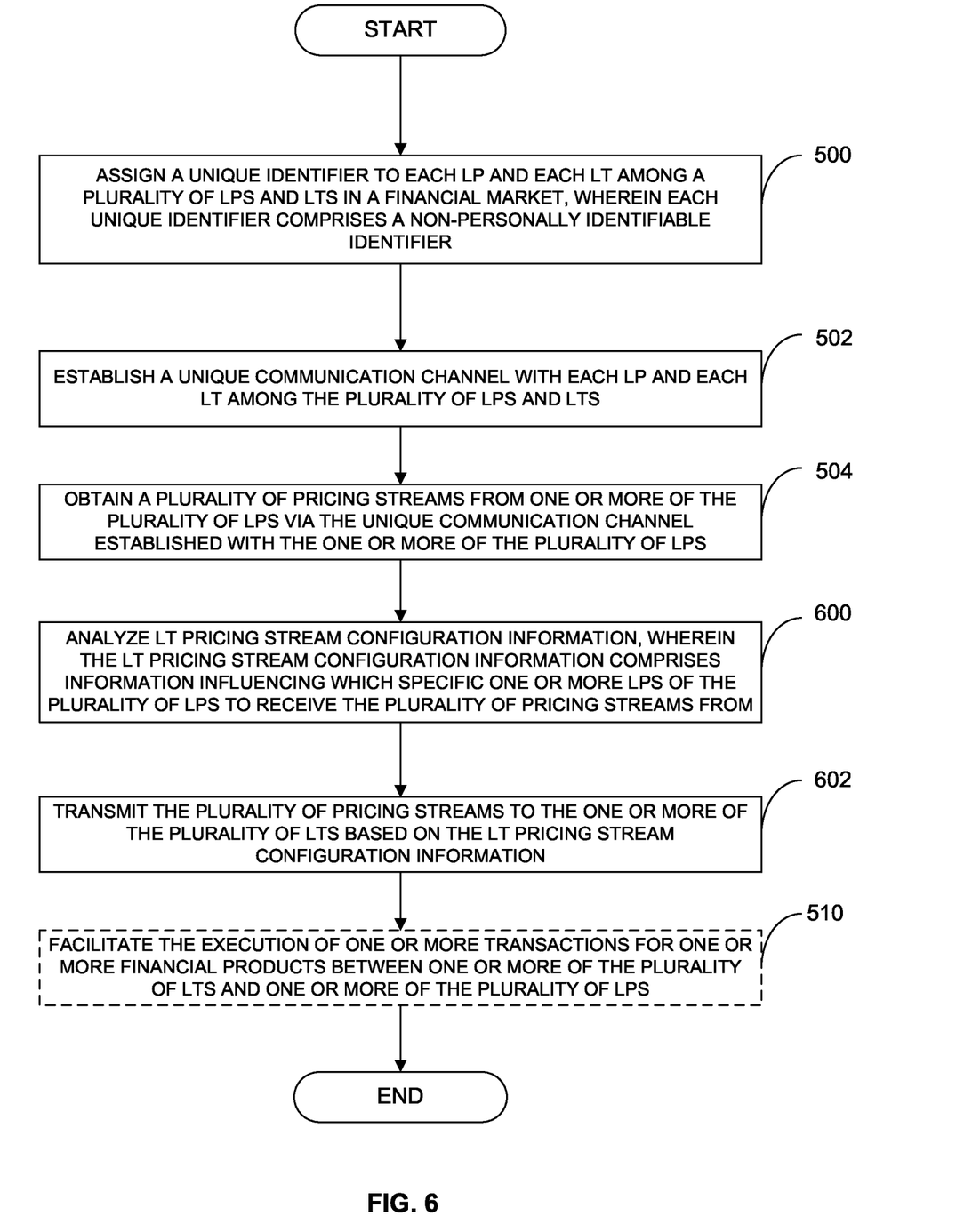
FIG. 6 is a flowchart illustrating another example of a method for facilitating transactions between a plurality of liquidity takers (LTs) and a plurality of liquidity providers (LPs), according to various aspects of the current disclosure.

Referring now to FIG. 6, a flowchart illustrating another example of a method for facilitating transactions between a plurality of LTs and LPs is provided. Steps 500-504 and step 510 may be carried out in accordance with the description of those steps provided above with regard to FIG. 5. At step 600, LT pricing stream configuration information is analyzed. The LT pricing stream information may include information influencing which specific LPs the one or more LTs would like to receive pricing streams from. At step 602, the plurality of pricing streams are transmitted to one or more of the plurality of LTs based on the LT pricing stream configuration information.

Figure 7:
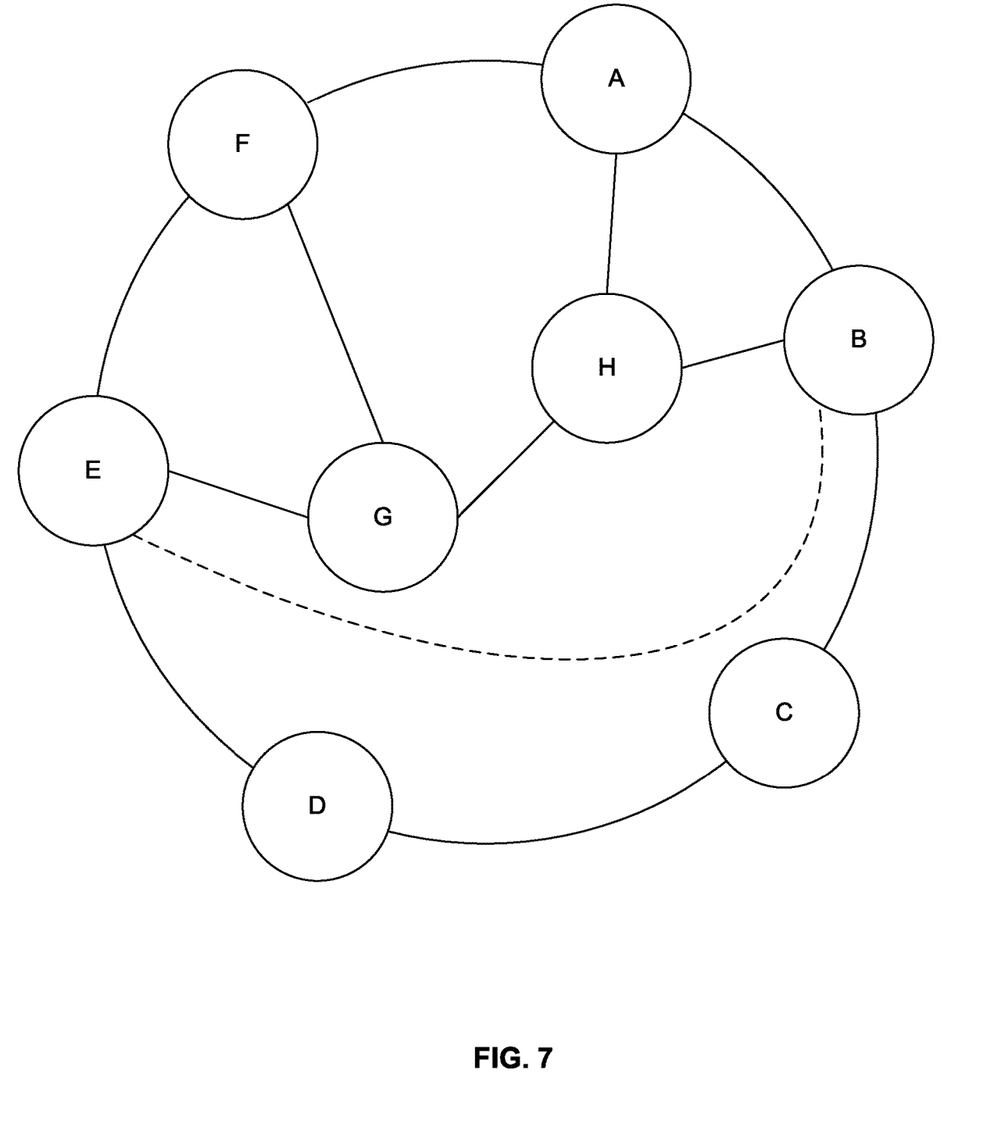
FIG. 7 is a relationship diagram illustrating one example of the direct and indirect relationships between different participants in a multi-participant market, according to one aspect of the current disclosure.

Referring now to FIG. 7, a relationship diagram illustrating one example of the direct and indirect participants in a multi-participant market is provided. In particular, FIG. 7 illustrates how the system described in the instant disclosure allows all market participants to transact with one another without having to, for example, clear and/or settle with one another. Stated another way, and as illustrated by FIG. 7, the system described in the instant disclosure provides every participant with the ability to transact with ever other participant in the marketplace without having to, for example, clear or settle with everyone. Because each participant may transact with every other participant in this model, each participant is provided with additional chances to obtain better pricing.

Specifically, FIG. 7 provides an example of a marketplace with six (8) Participants: A, B, C, D, E, F, G, and H. The solid lines between the individual participants represent direct (i.e., physical) relationships. In the context of a trading marketplace, a direct/physical relationship may signify, for example, that the parties have a credit relationship with one another. For example, the solid line between Participant A and Participant B reflects that there is a direct/physical relationship between these participants (such as, for example, a credit relationship). Conversely, the dotted line between participants represents an indirect (i.e., logical) relationship between the participants. Thus, the dotted line between Participant E and Participant B reflects that there is an indirect/logical relation between these participants (e.g., these participants do not have a credit relationship with one another).

Despite the fact that there is not a direct relationship between participants E and B, as shown in FIG. 7, these participants may nonetheless execute transactions with one another within the system of the instant disclosure. This is because the system of the instant disclosure relies on intermediary, direct relationships between participants to permit transactions between indirect participants. Referring back to the example of participants E and B—E and B may transact with one another because: (i) E has a direct relationship with participant G; (ii) G has a direct relationship with participant H; and (iii) H has a direct relationship with participant B. Stated another way, E and B may transact with one another within the system of the present disclosure because they are interconnected through direct, intermediary participant-relationships.

Of course, as shown, participants E and B may also transact with one another through several additional avenues. For example, (i) E has a direct relationship with participant F; (ii) F has a direct relationship with participant A; and (iii) A has a direct relationship with participant B. The decision on which particular avenue to utilize to affect transactions between participants that do not share a direct relationship may be based on several different factors, including, but not limited to: maximizing profit, minimizing costs, information disclosure, latency, testing/experimentation, and/or time of day.

In addition, FIG. 7 illustrates one example of how the participants may be identified through pseudonyms within the marketplace. The pseudonyms in the diagram shown in FIG. 7 are: "A," "B," "C," "D," "E," "F," "G," and "H." In one example of the instant disclosure, the pseudonyms are not the actual names of the participants (e.g., John Doe), but rather unique identifiers for the participants that, in one example, may be tied to that participant's past behavior. For example, the other participants within the marketplace may not know (or cannot view) the true identity (i.e., actual name) of participant "A," but the other participants may be able to view the past behavior (e.g., transactional history) associated with participant A. In this manner, the other participants can make informed decisions about whether they would like to transact with participant A, without being able to ascertain any personally identifiable information (e.g., name, street address, telephone number, etc.) regarding participant A.

Figure 8:
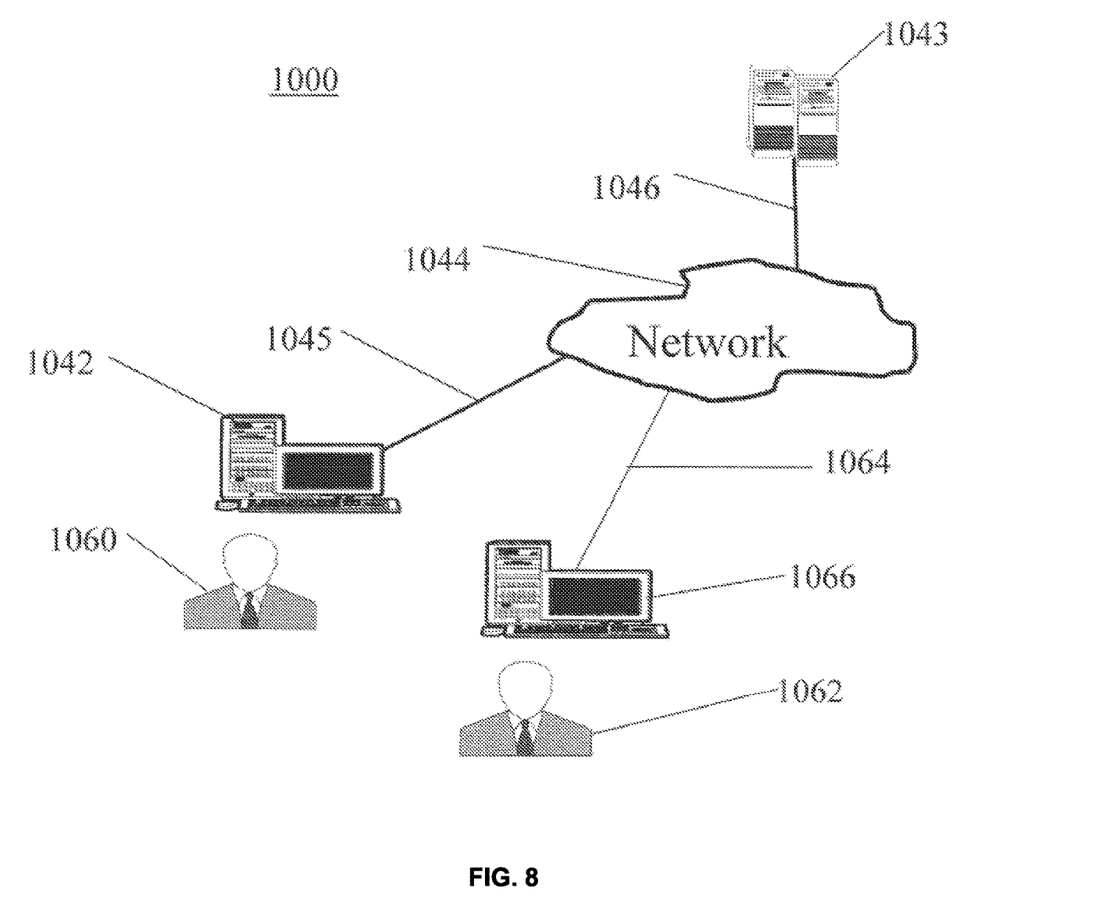
FIG. 8 is a block diagram illustrating various exemplary system components in a networked environment, according to one aspect of the current disclosure.

Referring now to FIG. 8, a block diagram illustrating various exemplary system components in a networked environment is provided. FIG. 8 shows a communication system 1000 usable in accordance with the present disclosure. The communication system 1000 includes one or more accessors 1060, 1062 (also referred to interchangeably herein as one or more "users") and one or more terminals 1042, 1066. In one aspect, data for use in accordance with the present invention is, for example, input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiber-optic links. In another aspect, the method and system of the present disclosure operate in a stand-alone environment, such as on a single terminal.

Figure 9:
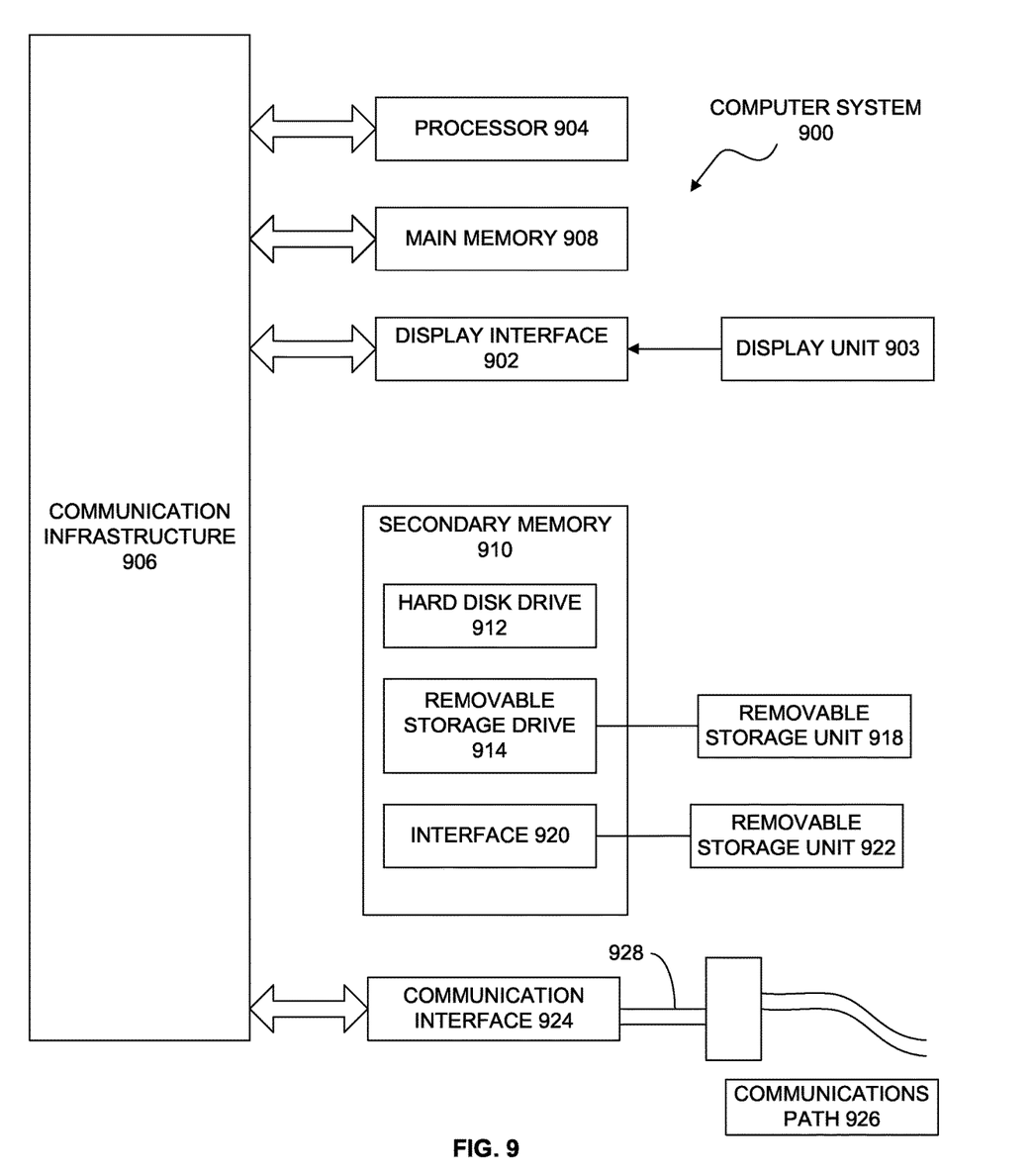
FIG. 9 is a block diagram illustrating an exemplary computing system suitable for use in implementing the teachings of the current disclosure.

Referring now to FIG. 9, a block diagram illustrating an exemplary computing system suitable for use in implementing the teachings of the current disclosure is provided. Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 903. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, and the like. The removable storage drive 914 reads from and/or writes to a removable storage unit 918 in a well-known manner. Removable storage unit 918, represents a floppy disk, magnetic tape, optical disk, and the like, which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, and the like. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer readable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the current disclosure, as discussed herein. In particular, the computer programs, when executed, enable the processor 910 to perform the features of the current disclosure. Accordingly, such computer programs represent controllers of the computer system 900.

In an aspect where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another aspect, the invention is implemented primarily in hardware using, for example, hardware components, such as application specific integrated circuits (ASICs), state machines, field-programmable gate arrays (FPGAs), etc. Implementation of the hardware state machine so as to perform the functions described herein will be apparent to persons skilled in the relevant art(s).

In yet another aspect, the inventive disclosures described herein may be implemented using a combination of both hardware and software.

While aspects of this disclosure have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the disclosure, as set forth above, are intended to be illustrative, not limiting. Various changes may be made without departing from the spirit and thereof. Therefore, aspects of the disclosure are intended to embrace all known or later-developed alternatives, modifications, variations, improvements, and/or substantial equivalents.

What is claimed is:

1. A computer-implemented method for facilitating transactions between a plurality of liquidity takers (LTs) and a plurality of liquidity providers (LPs) via a matrix, the computer-implemented method comprising:

assigning, by a processing device associated with the matrix, a unique identifier to each LP and each LT among the plurality of LPs and LTs in a financial market, wherein each unique identifier comprises a non-personally identifiable identifier;

establishing, by the processing device, a single unique communication channel with each LP and each LT among the plurality of LPs and LTs, wherein each LP and each LT is connected to the matrix via a single connection;

obtaining, by the processing device, a plurality of pricing streams from a first LP included in the plurality of LPs via the unique communication channel established with the first LP;

determining, by the processing device, one or more intermediaries through which the first LP is connected to one or more LTs included in the plurality of LTs;

generating, by the processing device, a first determination of whether to transmit a first pricing stream included in the plurality of pricing streams having a first price for a first financial product or a second pricing stream included in the plurality of pricing streams having a second price for the first financial product to a first LT included in the plurality of LTs based on a credit relationship between (1) an intermediary through which the first LP is connected to the first LT and (2) either the first LP or the first LT, and further based on whether the credit relationship between (1) the intermediary through which the first LP is connected to the first LT and (2) either the first LP or the first LT comprises a direct credit relationship or an indirect credit relationship;

transmitting the first pricing stream having the first price to the first LT based on the first determination;

generating, by the processing device, a second determination of whether to transmit the first pricing stream having the first price or the second pricing stream having the second price to a second LT included in the plurality of LTs based on a credit relationship between (1) an intermediary through which the first LP is connected to the second LT and (2) either the first LP or the second LT;

transmitting the second pricing stream having the second price to the second LT based on the second determination; and causing, by the processing device, the matrix to be displayed on a display device associated with at least one of the plurality of LPs and LTs, wherein the matrix is displayed via a graphical user interface (GUI) comprising at least one of the first pricing stream having the first price and the second pricing stream having the second price, wherein the matrix exchanges information with the at least one of the plurality of LPs and LTs via the GUI over a network.

2. The computer-implemented method of claim 1, further comprising:

facilitating the execution of one or more transactions for one or more financial products between one or more of the plurality of LTs and one or more of the plurality of LPs.

3. The computer-implemented method of claim 1, wherein the first determination and the second determination are further based on at least one of the following:

an economic value of an order flow from one or more of the plurality of LTs to one or more of the plurality of LPs;

a volume of orders;

an information value of the orders;

a market share value;

a uniqueness of a financial product sought to be transacted;

market conditions;

testing/experimentation;
information gathering;
competitive analysis; or
information disclosure.

4. The computer-implemented method of claim 1, wherein the financial market comprises at least one of the following:
a foreign exchange market;
a bond market;
an interest rate market;
an over-the-counter (OTC) market;
a mortgage market;
a financial derivatives market;
a credit products market;
a loans market;
a deposits market;
a money market;
a financial futures market;
a contract for differences (CFDs) market;
an energy products market;
a precious metals market;
a commodities market; or
a financial assets market.

5. A computing system for facilitating transactions between a plurality of liquidity takers (LTs) and a plurality of liquidity providers (LPs) via a matrix, the computing system comprising:
a processor associated with the matrix; and
a memory that includes a unique identifier assigning module and a communications module, wherein, when executed by the processor:
the unique identifier assigning module is configured to assign a unique identifier to each LP and each LT among the plurality of LPs and LTs in a financial market, and wherein each unique identifier comprises a non-personally identifiable identifier; and
the communications module is configured to:
establish a single unique communication channel with each LP and each LT among the plurality of LPs and LTs, wherein each LP and each LT is connected to the matrix via a single connection;
obtain a plurality of pricing streams from a first LP included in the plurality of LPs via the unique communication channel established with the first LP;
determine one or more intermediaries through which the first LP is connected to one or more LTs included in the plurality of LTs;
generate a first determination of whether to transmit a first pricing stream included in the plurality of pricing streams having a first price for a first financial product or a second pricing stream included in the plurality of pricing streams having a second price for the first financial product to a first LT included in the plurality of LTs based on a credit relationship between (1) an intermediary through which the first LP is connected to the first LT and (2) either the first LP or the first LT, and further based on whether the credit relationship between (1) the intermediary through which the first LP is connected to the first LT and (2) either the first LP or the first LT comprises a direct credit relationship or an indirect credit relationship;
transmit the first pricing stream having the first price to the first LT based on the first determination;
generate a second determination of whether to transmit the first pricing stream having the first price or the second pricing stream having the second price to a second LT based on included in the plurality of LTs based on a credit relationship between (1) an intermediary through which the first LP is connected to the second LT and (2) either the first LP or the second LT;
transmit the second pricing stream having the second price to the second LT based on the second determination; and
cause the matrix to be displayed on a display device associated with at least one of the plurality of LPs and LTs, wherein the matrix is displayed via a graphical user interface (GUI) comprising at least one of the first pricing stream having the first price and the second pricing stream having the second price, wherein the matrix exchanges information with the at least one of the plurality of LPs and LTs via the GUI over a network.

6. The computing system of claim 5, further comprising:
a transaction execution module, wherein, when executed by the processor, the transaction execution module is configured to facilitate the execution of one or more transactions for one or more financial products between one or more of the plurality of LTs and one or more of the plurality of LPs.

7. The computing system of claim 5, wherein the first determination and the second determination are further based on at least one of the following:
an economic value of an order flow from one or more of the plurality of LTs to one or more of the plurality of LPs;
a volume of orders; an information value of the orders; a market share value;
a uniqueness of a financial product sought to be transacted;
market conditions;
testing/experimentation;
information gathering;
competitive analysis; or
information disclosure.

8. The computing system of claim 5, wherein the financial market comprises at least one of the following:
a foreign exchange market;
a bond market;
an interest rate market;
an over-the-counter (OTC) market;
a mortgage market;
a financial derivatives market;
a credit products market;
a loans market;
a deposits market;
a money market;
a financial futures market;
a contract for differences (CFDs) market;
an energy products market;
a precious metals market;
a commodities market; or
a financial assets market.

9. A non-transitory computer-readable medium comprising executable instructions that, when executed by a processing device associated with a matrix, cause the processing device to carry out a method for facilitating transactions between a plurality of liquidity takers (LTs) and a plurality of liquidity providers (LPs) via the matrix, the method comprising:
assigning a unique identifier to each LP and each LT among the plurality of LPs and LTs in a financial market, wherein each unique identifier comprises a non-personally identifiable identifier;

establishing a single unique communication channel with each LP and each LT among the plurality of LPs and LTs, wherein each LP and each LT is connected to the matrix via a single connection;

obtaining a plurality of pricing streams from a first LP included in the plurality of LPs via the unique communication channel established with the first LP;

determining one or more intermediaries through which the first LP is connected to one or more LTs included in the plurality of LTs;

generating a first determination of whether to transmit a first pricing stream included in the plurality of pricing streams having a first price for a first financial product or a second pricing stream included in the plurality of pricing streams having a second price for the first financial product to a first LT included in the plurality of LTs based on a credit relationship between (1) an intermediary through which the first LP is connected to the first LT and (2) either the first LP or the first LT, and further based on whether the credit relationship between (1) the intermediary through which the first LP is connected to the first LT and (2) either the first LP or the first LT comprises a direct credit relationship or an indirect credit relationship;

transmitting the first pricing stream having the first price to the first LT based on the first determination;

generating a second determination of whether to transmit the first pricing stream having the first price or the second pricing stream having the second price to a second LT included in the plurality of LTs based on a credit relationship between (1) an intermediary through which the first LP is connected to the second LT and (2) either the first LP or the second LT;

transmitting the second pricing stream having the second price to the second LT based on the second determination; and causing the matrix to be displayed on a display device associated with at least one of the plurality of LPs and LTs, wherein the matrix is displayed via a graphical user interface (GUI) comprising at least one of the first pricing stream having the first price and the second pricing stream having the second price, wherein the matrix exchanges information with the at least one of the plurality of LPs and LTs via the GUI over a network.

10. The non-transitory computer-readable medium of claim 9, wherein the second determination is further based on whether the credit relationship between (1) the intermediary through which the first LP is connected to the second LT and (2) either the first LP or the second LT comprises a direct credit relationship or an indirect credit relationship.

* * * * *